United States Patent
Lo et al.

(10) Patent No.: US 9,906,588 B2
(45) Date of Patent: Feb. 27, 2018

(54) SERVER AND METHOD FOR EXTRACTING CONTENT FOR COMMODITY

(71) Applicant: HON HAI PRECISION INDUSTRY CO., LTD., New Taipei (TW)

(72) Inventors: Hung-Yi Lo, New Taipei (TW);
Chih-Ming Wang, New Taipei (TW);
Yi-Jyun Chang, New Taipei (TW);
Min-Chun Hu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 127 days.

(21) Appl. No.: 14/806,043

(22) Filed: Jul. 22, 2015

(65) Prior Publication Data

US 2016/0350264 A1 Dec. 1, 2016

(30) Foreign Application Priority Data

May 26, 2015 (TW) .............................. 104116870 A

(51) Int. Cl.
*G06F 17/00* (2006.01)
*H04L 29/08* (2006.01)
*G06F 17/27* (2006.01)
*G06F 17/30* (2006.01)
*G06Q 30/00* (2012.01)

(52) U.S. Cl.
CPC .......... *H04L 67/10* (2013.01); *G06F 17/278* (2013.01); *G06F 17/30861* (2013.01); *G06Q 30/00* (2013.01)

(58) Field of Classification Search
None
See application file for complete search history.

(56) References Cited

U.S. PATENT DOCUMENTS

| | | | | |
|---|---|---|---|---|
| 8,554,701 B1* | 10/2013 | Dillard | ................. | G06N 99/005 706/12 |
| 8,965,891 B1* | 2/2015 | Bengio | ............. | G06F 17/30244 707/608 |
| 2008/0133488 A1* | 6/2008 | Bandaru | ........... | G06F 17/30864 |
| 2009/0063247 A1* | 3/2009 | Burgess | ................. | G06Q 30/02 705/7.34 |
| 2009/0119268 A1* | 5/2009 | Bandaru | ............. | G06F 17/2745 705/7.12 |
| 2010/0050118 A1* | 2/2010 | Chowdhury | .......... | G06F 3/0482 715/810 |

(Continued)

FOREIGN PATENT DOCUMENTS

| TW | 200816010 A | 4/2008 |
|---|---|---|
| TW | 200939049 A | 9/2009 |
| TW | 201421265 A | 6/2014 |

*Primary Examiner* — Howard Cortes
(74) *Attorney, Agent, or Firm* — ScienBiziP, P.C.

(57) ABSTRACT

At a method for extracting content relating to a commodity which is executable on a server, the server including at least one processor and a storage device. The method includes acquiring a plurality of web articles from Internet; web articles associated with a commodity from the acquired web articles are recognized, a name for the commodity from the recognized web articles is extracted; and a representative picture for the commodity from all pictures in the recognized web articles is selected, the extracted content being extractable and returnable to a user upon input of a keyword.

15 Claims, 6 Drawing Sheets

(56) References Cited

U.S. PATENT DOCUMENTS

| | | | |
|---|---|---|---|
| 2011/0078162 A1* | 3/2011 | Nie | G06F 17/30867 |
| | | | 707/754 |
| 2011/0208669 A1* | 8/2011 | Ruhl | G06F 17/30873 |
| | | | 705/347 |
| 2011/0302148 A1* | 12/2011 | Kakade | G06F 17/30864 |
| | | | 707/710 |
| 2012/0131139 A1* | 5/2012 | Siripurapu | H04L 65/60 |
| | | | 709/217 |
| 2012/0158537 A1* | 6/2012 | Gonsalves | G06Q 30/0643 |
| | | | 705/26.7 |
| 2012/0254191 A1* | 10/2012 | Sanyal | G06F 17/30265 |
| | | | 707/744 |
| 2013/0117645 A1* | 5/2013 | Butlin | G06F 17/3089 |
| | | | 715/205 |
| 2013/0125005 A1* | 5/2013 | French | G06F 17/30864 |
| | | | 715/738 |
| 2013/0173603 A1* | 7/2013 | Hamilton | G06F 17/30268 |
| | | | 707/723 |
| 2015/0249652 A1* | 9/2015 | Sprague | H04L 12/1813 |
| | | | 726/3 |
| 2015/0278633 A1* | 10/2015 | Yeh | G06K 9/52 |
| | | | 382/103 |
| 2016/0005097 A1* | 1/2016 | Hsiao | G06Q 30/0631 |
| | | | 705/26.7 |

* cited by examiner

SERVER AND METHOD FOR EXTRACTING CONTENT FOR COMMODITY

CROSS-REFERENCE TO RELATED APPLICATIONS

This application claims priority to Taiwanese Patent Application No. 104116870 filed on May 26, 2015, the contents of which are incorporated by reference herein.

FIELD

The subject matter herein generally relates to information processing technology.

BACKGROUND

Social platforms, including forums and blogs, can provide release of information or the exchange of ideas. The information posted on the forums can be moderated or unmoderated. In moderated forums a user first posts a message and then a moderator reviews it prior to being public. However, most forums are unmoderated whereby users are generally free to post what they want and where they want.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
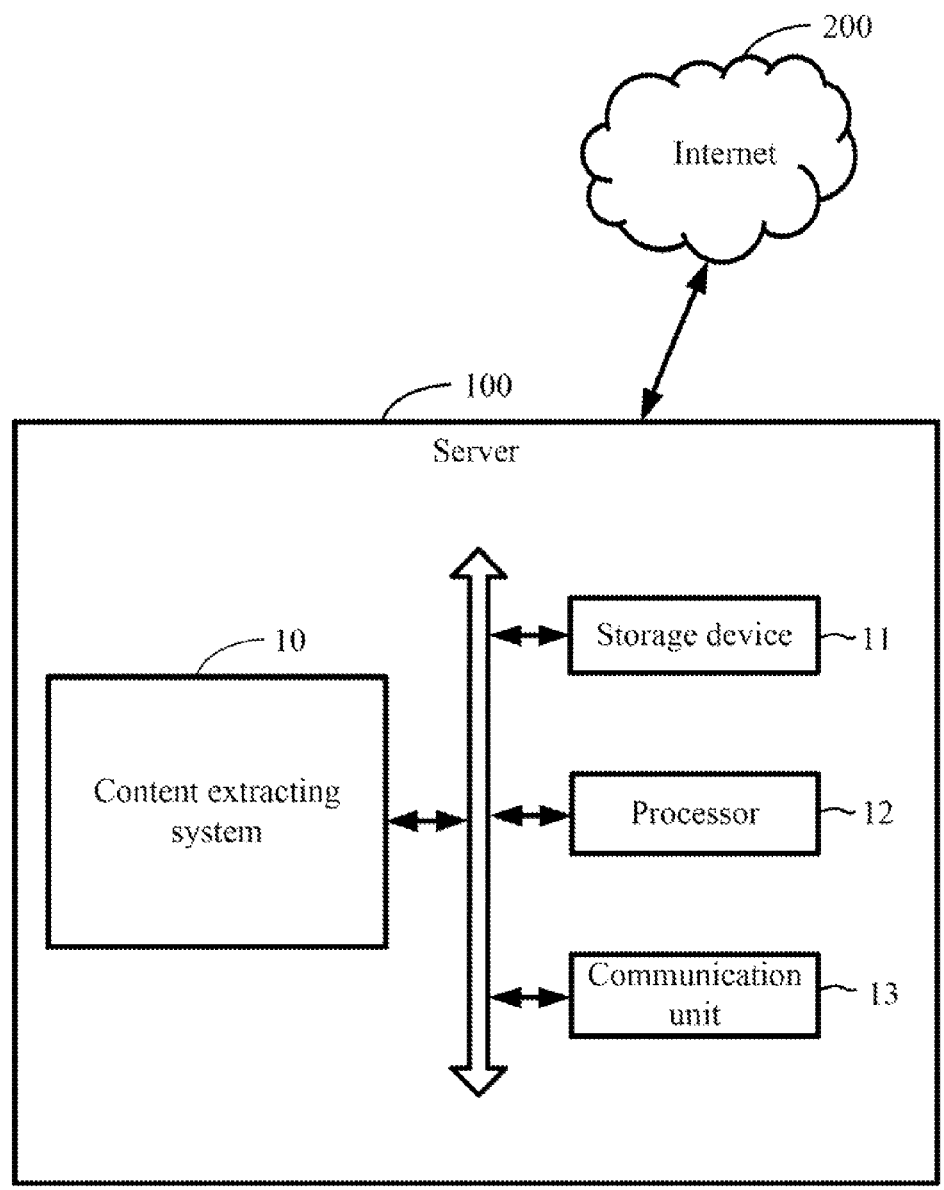
FIG. 1 is a block diagram of one embodiment of a server.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The disclosure, referring to the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

FIG. 1 illustrates one embodiment of a server. In at least one embodiment as shown in FIG. 1, a server 100 may include, but is not limited to, a content extracting system 10, a storage device 11, at least one processor 12, and a communication unit 13. The server 100 can be a network server, a cloud server, or any other computing device. FIG. 1 illustrates only one example of the server 100. Those skilled in the art may understand that the server 100 can include more or fewer components than illustrated, or have a different configuration of the various components in other embodiments.

In at least one embodiment, the storage device 11 can include various types of non-transitory computer-readable storage mediums. For example, the storage device 11 can be an internal storage system, such as a flash memory, a random access memory (RAM) for temporary storage of information, and/or a read-only memory (ROM) for permanent storage of information. The storage device 11 can also be an external storage system, such as a hard disk, a storage card, or a data storage medium.

In at least one embodiment, the at least one processor 12 can be a central processing unit (CPU), a microprocessor, or other data processing chip that performs functions of the content extracting system 10 in the server 100.

In at least one embodiment, the communication unit 13 can communicate with Internet 200. In some embodiments, the communication unit 13 can obtain information from the Internet 200 and/or upload information to the Internet 200.

In at least one embodiment, the content extracting system 10 can provide a representative picture and a content summary for a commodity. The content extracting system 10 can provide users with data, reference information, and answers to query, to help users to judge and make important purchase decisions quickly.

Figure 2:
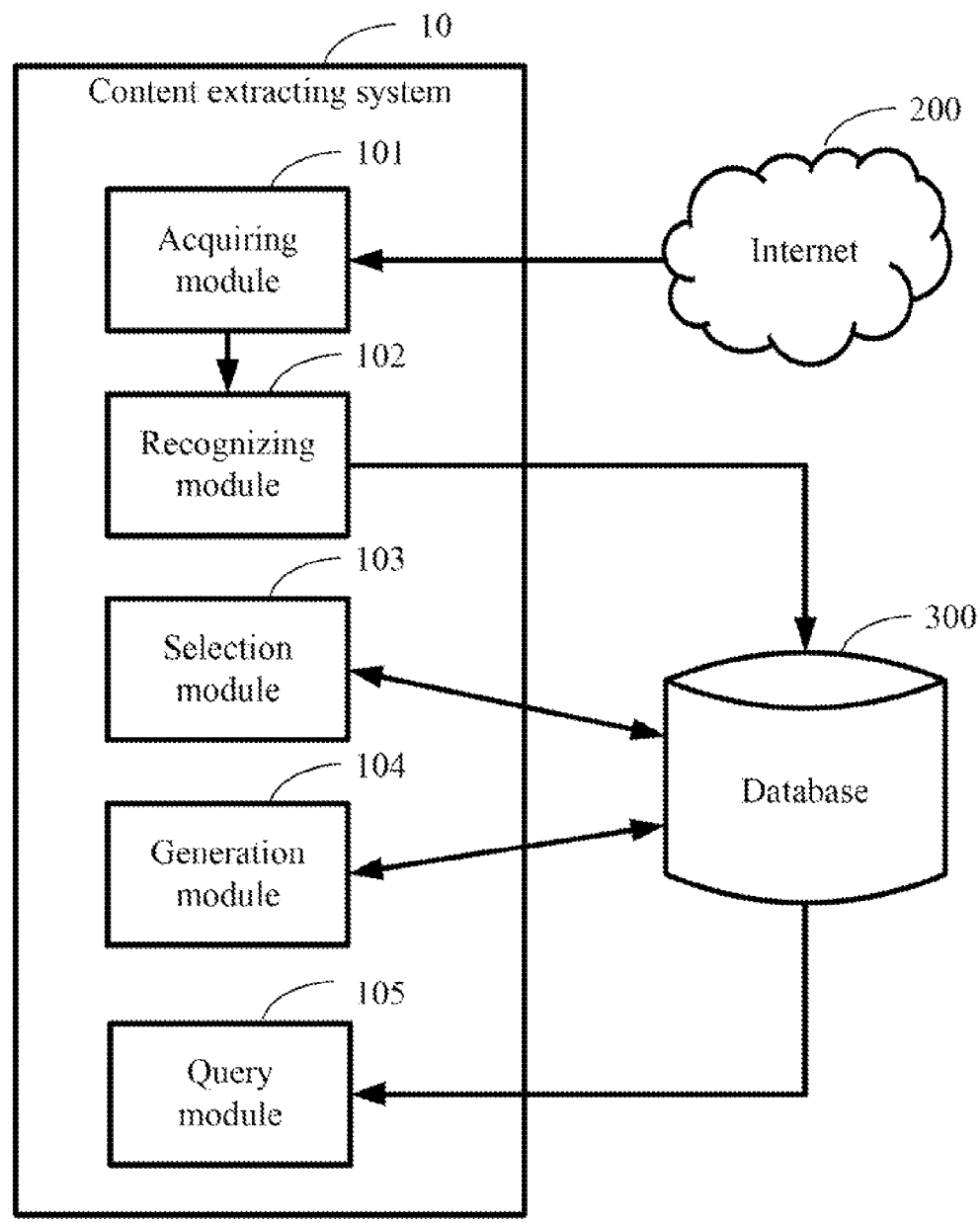
FIG. 2 is a block diagram of one embodiment of function modules of content extracting system.

FIG. 2 is a block diagram of one embodiment of function modules of the content extracting system 10. In at least one embodiment, the content extracting system 10 can include an acquiring module 101, a recognizing module 102, a selection module 103, a generation module 104, and a query module 105. The function modules can include computerized code in the form of one or more programs which are stored in the storage device 11 of the server 100. The at least one processor 12 executes the computerized code to provide functions.

The acquiring module 101 can acquire a plurality of web articles from the Internet 200 through the communication unit 13 of the server 100.

In some embodiments, the acquiring module 101 can use a method, such as crawler arithmetic, robot arithmetic, or spider arithmetic, to acquire at regular intervals a plurality of web articles from the Internet 200.

In some embodiments, the plurality of web articles can include blogs, forums, review sites, or any other active server pages.

The recognizing module 102 can recognize web articles associated with a predetermined commodity from the acquired web articles and extract a name for the commodity from the recognized web articles. The recognized web articles and the commodity name can be linked and stored in a database 300. For example, the database 300 can be a database of restaurants.

In some embodiments, the commodity can be a computer, communication, and consumer electronics (3C) product, a household appliance, a motor vehicle, beauty makeup product, or restaurants.

As an example, a restaurant and blogs acquired from the Internet 200 can be a commodity and the blogs can be web articles. The recognizing module 102 can determine whether the blogs are associated with food or a restaurant. In some embodiments, the recognizing module 102 can first express each of the plurality of web articles as bag-of-words feature vectors. A bag-of-words model is a simplifying representation used in natural language processing and information retrieval (IR). In this model, a texts (such as a sentence or a document) is represented as the bag (multisite) of its words, disregarding grammar and even word order but keeping multiplicity. Recently, the bag-of-words model has also been used for computer vision. The bag-of-words model is commonly used in methods of document classification, where the (frequency of) occurrence of each word is used as a feature for training a classifier. Then, the recognizing module 102 can determine whether or not a blog is associated with food through a food recognition classifier which is set up and limited in advance.

In some embodiments, the food recognition classifier can be set up as follows: first, preparing two classes of web articles (one class of web articles relating to food can be as positive samples, another class of web articles not relating to food can be as negative samples) as conditions. Second, expressing the positive samples and the negative samples as bags-of-words feature vectors. Third, delimiting these bags-of-words feature vectors using a machine learning classification algorithm (e.g. Support Vector Machine, Random Forests, or Neural Network). Thus a food recognition classifier can be set up and given a target through the above three steps.

In some embodiments, when a recognition is made that blogs acquired from the Internet 200 are not associated with food, the blogs are useless That is to say, when blogs have been recognized as not being associated with food, the blogs will not be sent to the subsequent steps and not be stored in the database of restaurants. When a recognition is made that blogs acquired from the Internet 200 are associated with food, the blogs are reserved. When blogs have been recognized as being associated with food, the blogs will be sent to subsequent steps and stored in the database of restaurants.

In first embodiment, the recognizing module 102 can extract a name for the commodity through a method of a structured style. Taking a particular restaurant as an example, the recognizing module 102 can search whether there are structured style sentences existing in the web articles that have been recognized as being associated with food. The structured style can comprise: name: XXX, address: XXX, and telephone number: XXX. If there are structured style sentences existing in the web articles that have been recognized as being associated with food, the recognizing module 102 fetches the name, address, and telephone number. Then, the recognizing module 102 can search for the name, address, and telephone of a commodity in a restaurant database. If the name, address, or telephone number of a commodity are not in the restaurant database, the recognizing module 102 stores the name, address, and telephone of the commodity, and stores the web articles that have been recognized as being associated with food. If the name, address, and telephone number of a commodity do exist in the restaurant database, the recognizing module 102 merely stores the web articles that have been recognized as being associated with food.

In second embodiment, the recognizing module 102 can extract a name for the commodity through a method of a non-structured style. Taking a restaurant as an example, the recognizing module 102 can search texts of the web articles, and segment each sentence of the texts into several units/words through a natural language processing technology. The natural language processing technology is very well known and is not described here. Each segmented unit/word can be treated as a possible candidate name. The recognizing module 102 selects a segmented unit/word which has the most frequent appearance. For example, XXX is a century-old shop, a special food of XXX is sour pickled cabbage, an address of XXX is ZhongShan road. The "XXX" appeared three times, but the features of century-old shop, a special food, and an address appeared only one time. Finally, if a number of appearances of a segmented unit/word is more than a predetermined value (e.g. ten), the segmented unit/word can be treated as the commodity name.

The selecting module 103 can select a representative picture for the commodity from all pictures in the recognized web articles, and can store the representative picture in the database 300.

In some embodiments, all the pictures in recognized web articles can comprise pictures representing commodity information and pictures as content information in relation to the commodity.

In some embodiments, the selecting module 103 can first preprocess all the pictures in recognized web articles. The totality of pictures in the recognized web articles can be preprocessed by the following steps: first, removing a picture having a face of a user, removing a picture of which the pixel value is too low, and removing a black and white picture. Second, extracting feature vectors of each preprocessed picture. The feature vectors can be colors, saturation, intensity, contrast, clarity, and bags-of-visual-words vectors. Third, transmitting the feature vectors to an image recognition classifier. The image recognition classifier can grade the feature vectors from high to low; and the grade can a basis for selecting a representative picture. Fourth, selecting a representative picture for the commodity according to a highest grade. The representative picture can stimulate consumer's appetite, and can reflect the characteristics of the restaurant.

The image recognition classifier can be generated as follows: preparing two classes of pictures (one class of pictures can be positive samples, another class of pictures can be negative samples) for setting conditions. Then, expressing the positive samples and the negative samples as feature vectors. Finally, setting up the conditions in relation to these feature vectors using a machine learning classification algorithm (e.g. Support Vector Machine, Random Forests, and Neural Network). Thus an image recognition classifier can be generated through the above three steps.

The generation module 104 can generate a content summary of the commodity from user reviews in the recognized web articles.

First, the generation module 104 can segment user reviews in the recognized web articles into sentences and extract keywords after segmenting the sentence into words. For example, a sentence which is "service of courses is fast," can be segmented as "service of courses is/v fast/a ./w", wherein "/v" is a verb, "/a" is a adjective, and "/w" is punctuation. Then, the generation module 104 determines whether the segmented words match with words in feature thesaurus. There are four polarities of the features thesaurus: taste, service, environment, and price. If the segmented words match with words in feature thesaurus, the segmented words are extracted as keywords, and a polarity of the words is identified. If the segmented words are not matched with words in feature thesaurus, a polarity of the words is identified as otherwise. For example, a segmented word "delicious/mouth feel/drink" is matched with a word "taste" in feature thesaurus, and the segmented word "delicious/mouth feel/drink" can be identified as taste polarity.

Second, the generation module 104 can traverse every segmented word, and extract emotion words according to emotion thesaurus, and determine a polarity of the emotion words. For example, there are two emotion features of thesaurus: good emotion and bad emotion. The emotion words of good emotion in thesaurus can comprise tasty, delicious, delicate, and so on. The emotion words in thesaurus can comprise: unpalatable, greasy, raw and so on. Then, the generation module 104 compares whether a first number (of emotion words in the good emotions of thesaurus) is much more than a second number (of emotion words in the bad emotion of thesaurus). If the first number is much more than the second number, a polarity of the emotion words can be determined as good emotion. If the first number is the same or not much more than the second number, a polarity of the emotion words can be determined as being of bad emotion.

Third, the generation module 104 can generate a content summary of the commodity by outputting the keyword which appears most frequently and an emotion word of a much greater first number. For example, the keyword appearing most times may be "tasty", and the emotion word which has a much greater first number is "good", then a content summary of a restaurant is "tasty good".

The query module 105 can display a content summary and a representative picture stored in the database 300 when receiving a keyword input by a user.

In some embodiments, the user can input a keyword through an online search engine. When the Internet 200 receives a search request of the user, the Internet 200 can sent the search request to the content extracting system 10 of the server 100. The query module 105 searches for and returns a corresponding content summary and a corresponding representative picture on a commodity from the database 300.

Figure 3:
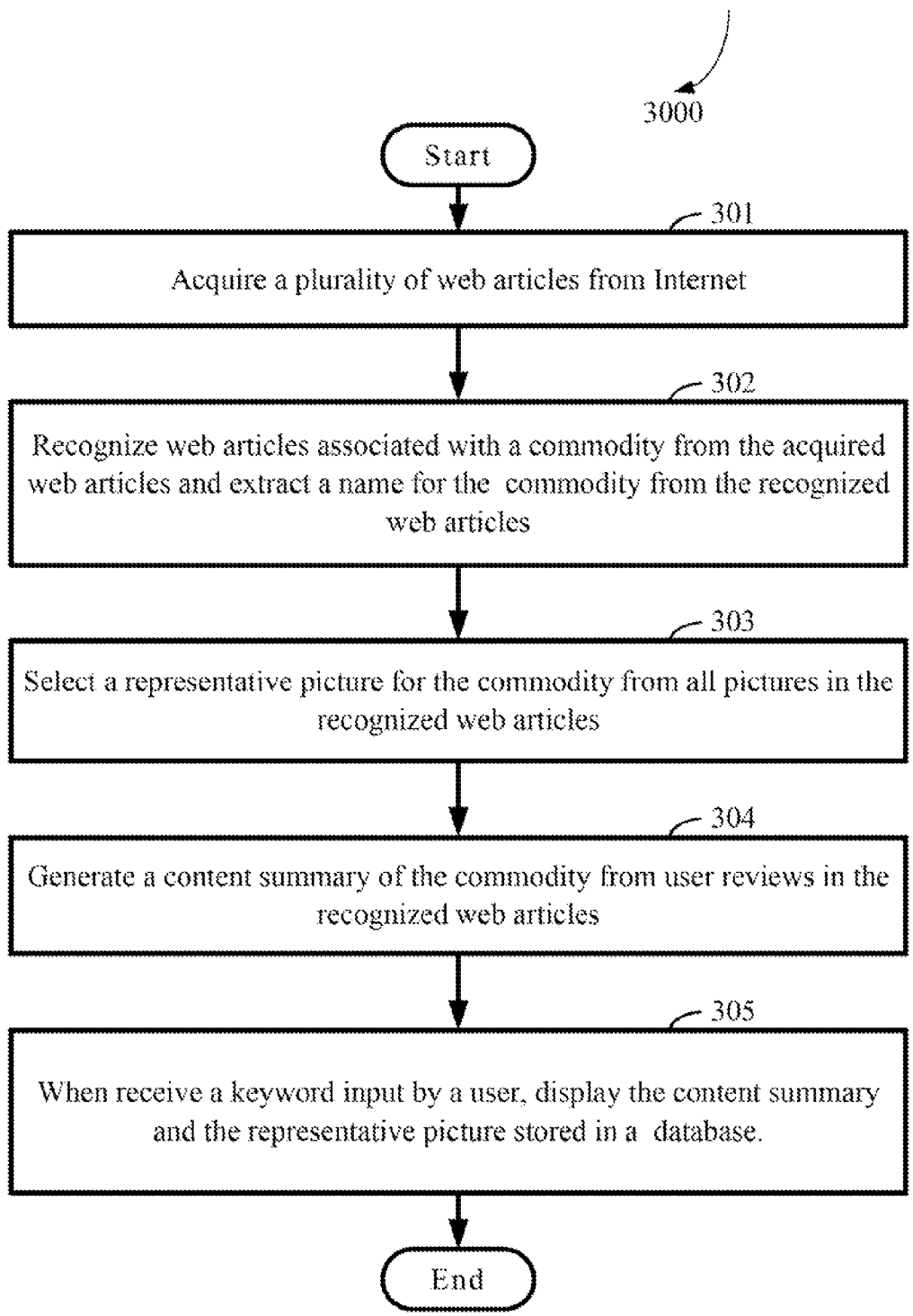
FIG. 3 illustrates a flowchart of one embodiment of a method for extracting content for a commodity

Referring to FIG. 3, a flowchart is presented in accordance with an example embodiment. The example method 3000 is provided by way of example, as there are a variety of ways to carry out the method. The example method 3000 described below can be carried out using the configurations illustrated in FIG. 1 and FIG. 2, for example, and various elements of these figures are referenced in explaining example method 3000. Each block shown in FIG. 3 represents one or more processes, methods, or subroutines, carried out in the example method 3000. Furthermore, the illustrated order of blocks is by example only and the order of the blocks can be changed. The example method 3000 can begin at block 301. Depending on the embodiment, additional blocks can be added, others removed, and the ordering of the blocks can be changed.

At block 301, an acquiring module acquires a plurality of web articles from the Internet 200 through the communication unit 13 of the server 100.

At block 302, a recognizing module recognizes web articles associated with a commodity from the acquired web articles and extract a name for the commodity from the recognized web articles. Specifically, a detailed process of extracting a name for the commodity is as described in FIG. 4.

At block 303, a selecting module selects a representative picture for the commodity from all pictures in the recognized web articles, and stores the representative picture in the database 300. Specifically, a detailed process of selecting a representative picture for the commodity is as described in FIG. 5.

At block 304, a generation module generates a content summary of the commodity from user reviews in the recognized web articles and stores the content summary in the database 300. Specifically, a detailed process of generating a content summary of the commodity is as described in FIG. 6.

At block 305, a query module displays a content summary and a representative picture stored in the database 300 when receiving a keyword input by a user.

Figure 4:
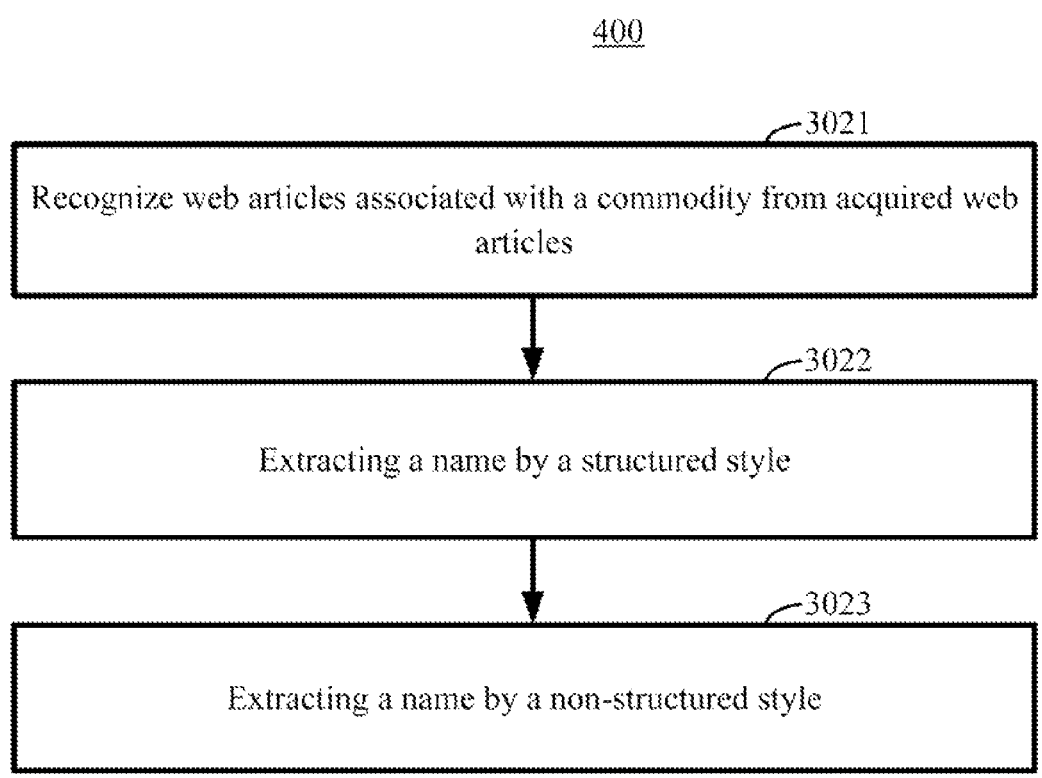
FIG. 4 illustrates a flowchart of one embodiment of a method for naming a commodity.

Referring to FIG. 4, a flowchart is presented in accordance with an example embodiment. The example method 400 is provided by way of example, as there are a variety of ways to carry out the method. Each block shown in FIG. 4 represents one or more processes, methods, or subroutines, carried out in the example method 400. The example method 400 can begin at block 3021. Depending on the embodiment, additional blocks can be added, others removed, and the ordering of the blocks can be changed.

At block 3021, a recognizing module determines whether the blogs acquired from the Internet 200 are associated with the commodity.

At block 3022, a recognizing module extracts a name for the commodity through a method of a structured style. Taking a particular restaurant as an example, a recognizing module searches whether there are structured style sentences existing in the web articles that have been recognized as being associated with food. The structured style can comprise: name: XXX, address: XXX, and telephone number: XXX. If there are structured style sentences existing in the blogs that have been recognized as being associated with food, a recognizing module fetches the name, address, and telephone number.

At block 3023, a recognizing module extracts a name for the commodity through a method of a non-structured style. Taking a restaurant as an example, a recognizing module searched texts of the web articles, and segment each sentence of the texts into several units/words through a natural language processing technology. The natural language processing technology is very well known and is not described here. Each segmented unit/word can be treated as a possible candidate name. A recognizing module selects a segmented unit/word which has the most frequent appearance. For example, XXX is a century-old shop, a special food of XXX is sour pickled cabbage, an address of XXX is ZhongShan road. The "XXX" appeared three times, but the features of century-old shop, a special food, and an address appeared only one time. Finally, if a number of appearances of a segmented unit/word is more than a predetermined value (e.g. ten), the segmented unit/word can be treated as the commodity name.

Figure 5:
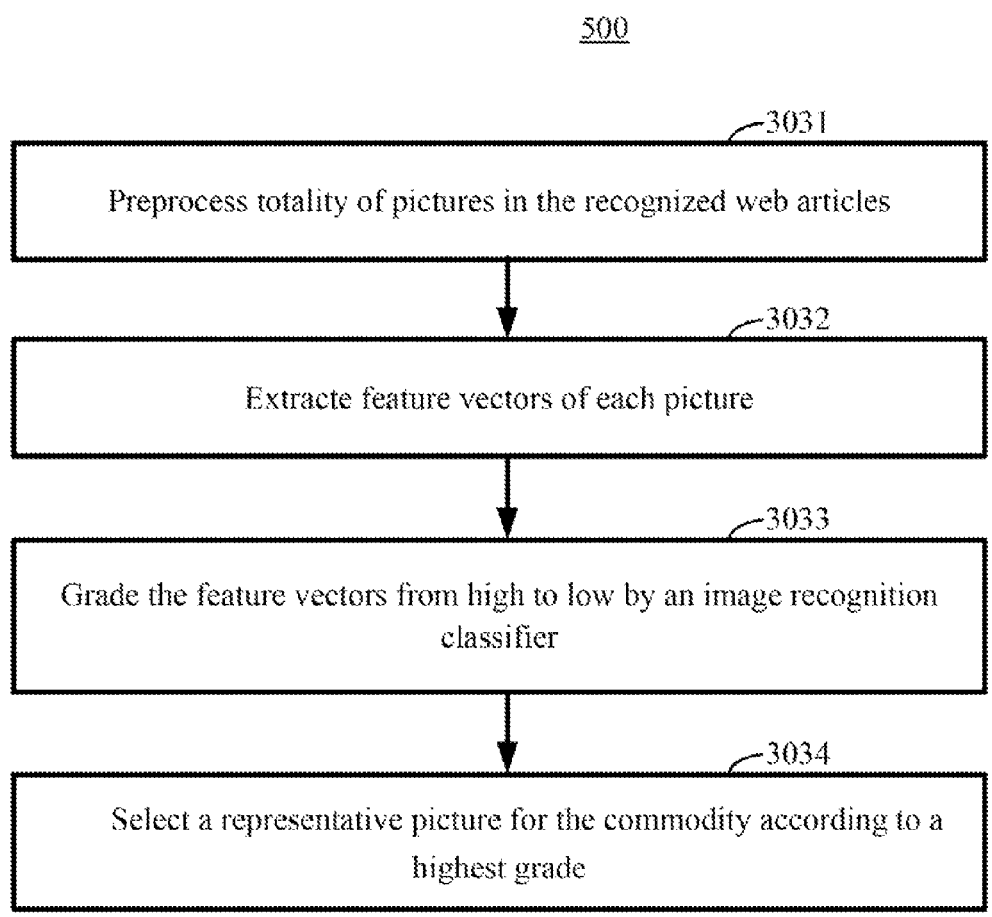
FIG. 5 illustrates a flowchart of one embodiment of a method for selecting a representative picture for a commodity.

Referring to FIG. 5, a flowchart is presented in accordance with an example embodiment. The example method 500 is provided by way of example, as there are a variety of ways to carry out the method. Each block shown in FIG. 5 represents one or more processes, methods, or subroutines, carried out in the example method 500. The example method 500 can begin at block 3031. Depending on the embodiment, additional blocks can be added, others removed, and the ordering of the blocks can be changed.

At block 3031, a selecting module preprocesses the totality of pictures in the recognized web articles. The totality of pictures in the recognized web articles can be preprocessed by removing a picture having a face of a user, removing a picture of which the pixel value is too low, and removing a black and white picture.

At block 3032, a selecting module extracts feature vectors of each preprocessed picture. The feature vectors can be colors, saturation, intensity, contrast, clarity, and bags-of-visual-words vectors.

At block 3033, an image recognition classifier grades the feature vectors from high to low. The image recognition classifier can be generated as follows: preparing two classes of pictures (one class of pictures can be positive samples, another class of pictures can be negative samples) for setting conditions. Then, expressing the positive samples and the negative samples as feature vectors. Finally, setting up the conditions in relation to these feature vectors using a machine learning classification algorithm (e.g. Support Vector Machine, Random Forests, and Neural Network). The image recognition classifier can grade the feature vectors from high to low; and the grade can a basis for selecting a representative picture.

At block 3034, a selecting module selects a representative picture for the commodity according to a highest grade. The representative picture can stimulate consumer's appetite, and can reflect the characteristics of the restaurant.

Figure 6:
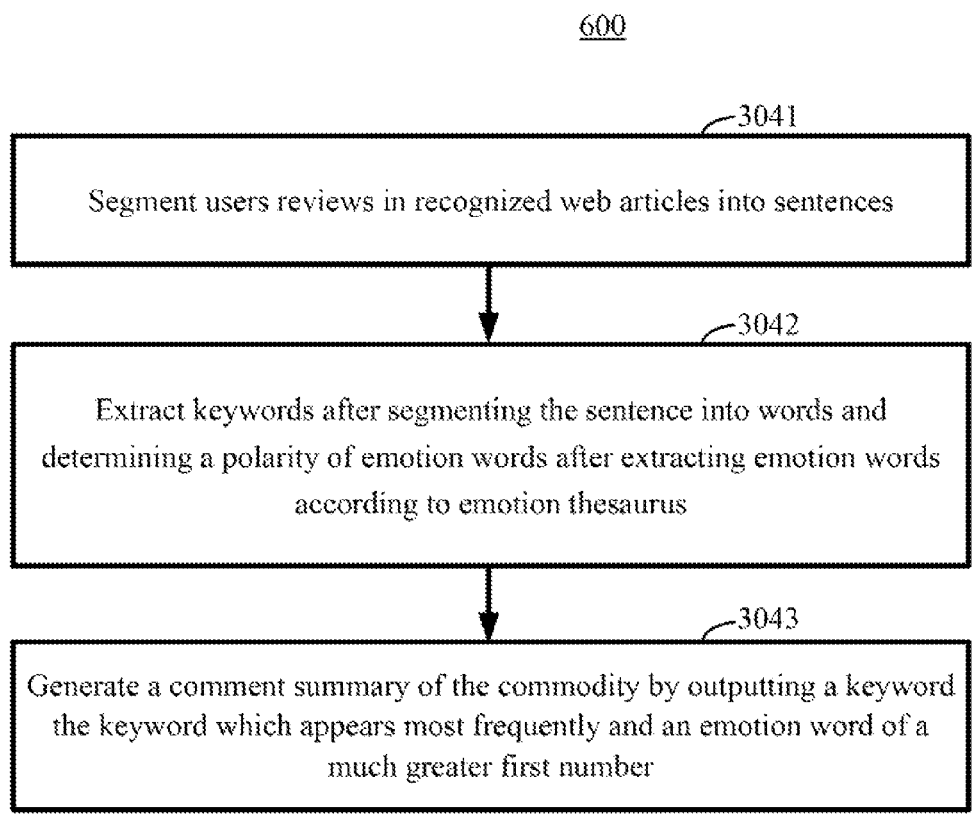
FIG. 6 illustrates a flowchart of one embodiment of a method for generating a content summary regarding a commodity.

Referring to FIG. 6, a flowchart is presented in accordance with an example embodiment. The example method 600 is provided by way of example, as there are a variety of ways to carry out the method. Each block shown in FIG. 6 represents one or more processes, methods, or subroutines, carried out in the example method 600. The example method 600 can begin at block 3041. Depending on the embodiment, additional blocks can be added, others removed, and the ordering of the blocks can be changed.

At block 3041, a generation module segments user reviews in the recognized web articles into sentences and extract keywords after segmenting the sentence into words. For example, a sentence which is "service of courses is fast," can be segmented as "service of courses is/v fast/a ./w", wherein "/v" is a verb, "/a" is a adjective, and "/w" is punctuation.

At block 3042, a generation module traverses every segmented word, and extract emotion words according to emotion thesaurus, and determine a polarity of the emotion words. There are four polarities of the features thesaurus: taste, service, environment, and price. If the segmented words match with words in feature thesaurus, the segmented words are extracted as keywords, and a polarity of the words is identified. If the segmented words are not matched with words in feature thesaurus, a polarity of the words is identified as otherwise. For example, a segmented word "delicious/mouth feel /drink" is matched with a word "taste" in feature thesaurus, and the segmented word "delicious/ mouth feel /drink" can be identified as taste polarity. There are two emotion features of thesaurus: good emotion and bad emotion. The emotion words of good emotion in thesaurus can comprise tasty, delicious, delicate, and so on. The emotion words in thesaurus can comprise: unpalatable, greasy, raw and so on. Then, a generation module compares whether a first number (of emotion words in the good emotions of thesaurus) is much more than a second number (of emotion words in the bad emotion of thesaurus). If the first number is much more than the second number, a polarity of the emotion words can be determined as good emotion. If the first number is the same or not much more than the second number, a polarity of the emotion words can be determined as being of bad emotion.

At block 3043, a generation module generates a content summary of the commodity by outputting the keyword which appears most frequently and an emotion word of a much greater first number. For example, the keyword appearing most times may be "tasty", and the emotion word which has a much greater first number is "good", then a content summary of a restaurant is "tasty good".

It should be emphasized that the above-described embodiments of the present disclosure, and of any embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included within the scope of this disclosure and protected by the following claims.

What is claimed is:

1. A method for extracting content of commodity executable on a server, the server comprising at least one processor and a storage device, and the method comprising:
   acquiring, at the server, a plurality of web articles from Internet;
   recognizing, at the server, web articles associated with a commodity from the acquired plurality of web articles, wherein the commodity is one of a product of interest or a place of interest;
   extracting, at the server, a name for the commodity from the recognized web articles;
   selecting, at the server, a representative picture for the commodity from all pictures in the recognized web articles, wherein, selecting the representative picture for the commodity from all pictures in the recognized web articles comprises:
      preprocessing all the pictures in recognized web articles, wherein preprocessing all the pictures in recognized web articles comprises:
         removing pictures having a face of a user;
         removing pictures of which pixel value are low; and
         removing black and white pictures;
      extracting feature vectors of each picture after preprocessing totality of pictures in the recognized web articles;
      grading the feature vectors from high to low by an image recognition classifier; and
      selecting a representative picture for the commodity according to a highest grade; and
   generating a content summary for the commodity from user reviews in the recognized web articles.

2. The method according to claim 1, wherein the name for the commodity is extracted by a structured style, comprising:

fetching a name, address and telephone number when there are structured style sentences existing in the web articles that have been recognized as being associated with food, wherein the structured style is: name: XXX, address: XXX, telephone number: XXX; and storing the name, address and telephone number of the commodity when there is not the name, address or telephone number of the commodity in a database.

3. The method according to claim 1, wherein the name for the commodity is extracted by a non-structured style, comprising:

searching texts of the web articles;

segmenting each sentence of the texts into several units/words through a natural language processing technology; and extracting the commodity name when a number of appearances of a segmented unit/word is more than a predetermined value.

4. The method according to claim 1, wherein the content summary is generated by:

segmenting users reviews in the recognized web articles into sentences;

extracting keywords after segmenting the sentence into words;

determining a polarity of emotion words after extracting emotion words according to emotion thesaurus; and generating a content summary of the commodity by outputting the keyword which appears most frequently and an emotion word of a much greater first number.

5. The method according to claim 4, further comprising:

displaying the content summary and the representative picture when receiving a keyword input by a user.

6. A server, comprising:

at least one processor; and a non-transitory storage device that stores one or more programs which, when executed by the at least one processor, cause the at least one processor to:

acquire a plurality of web articles from Internet;

recognize web articles associated with a commodity from the acquired plurality of web articles, wherein the commodity is one of a product of interest or a place of interest;

extract a name for the commodity from the recognized web articles;

select a representative picture for the commodity from all pictures in the recognized web articles, wherein, selecting the representative picture for the commodity from all pictures in the recognized web articles comprises:

preprocessing all the pictures in recognized web articles, wherein preprocessing all the pictures in recognized web articles comprises:

removing pictures having a face of a user;

removing pictures of which pixel value are low; and removing black and white pictures;

extracting feature vectors of each picture after preprocessing totality of pictures in the recognized web articles;

grading the feature vectors from high to low by an image recognition classifier; and selecting a representative picture for the commodity according to a highest grade; and generating a content summary for the commodity from user reviews in the recognized web articles.

7. The server according to claim 6, wherein the name for the commodity is extracted by a structured style, comprise:

fetch a name, address and telephone number when there are structured style sentences existing in the web articles that have been recognized as being associated with food, wherein the structured style is: name: XXX, address: XXX, telephone number: XXX; and store the name, address and telephone number of the commodity when there is not the name, address or telephone number of the commodity in a database.

8. The server according to claim 6, wherein the name for the commodity is extracted by a non-structured style, comprising:

search texts of the web articles;

segment each sentence of the texts into several units/words through a natural language processing technology; and extract the commodity name when a number of appearances of a segmented unit/word is more than a predetermined value.

9. The server according to claim 6, wherein the content summary is generated by:

segment users reviews in the recognized web articles into sentences;

extract keywords after segmenting the sentence into words;

determine a polarity of emotion words after extracting emotion words according to emotion thesaurus; and generate a content summary of the commodity by outputting the keyword which appears most frequently and an emotion word of a much greater first number.

10. The server according to claim 9, further comprising:

display the content summary and the representative picture when receiving a keyword input by a user.

11. A non-transitory storage medium having stored thereon instructions that, when executed by at least one processor of a server, causes the at least one processor to perform a method for extracting picture and abstract of web article, the server comprising at least one processor and a storage device, wherein the method comprising:

acquiring a plurality of web articles from Internet;

recognizing web articles associated with a commodity from the acquired web articles, wherein the commodity is one of a product of interest or a place of interest;

extracting a name for the commodity from the recognized web articles;

selecting a representative picture for the commodity from all pictures in the recognized web articles, wherein, selecting the representative picture for the commodity from all pictures in the recognized web articles comprises:

preprocessing all the pictures in recognized web articles, wherein preprocessing all the pictures in recognized web articles comprises:

removing pictures having a face of a user;

removing pictures of which pixel value are low; and removing black and white pictures;

extracting feature vectors of each picture after preprocessing totality of pictures in the recognized web articles;

grading the feature vectors from high to low by an image recognition classifier; and selecting a representative picture for the commodity according to a highest grade; and generating a content summary for the commodity from user reviews in the recognized web articles.

12. The non-transitory storage medium according to claim 11, wherein the name for the commodity is extracted by a structured style, comprising:

fetching a name, address and telephone number when there are structured style sentences existing in the web articles that have been recognized as being associated with food, wherein the structured style is: name: XXX, address: XXX, telephone number: XXX; and storing the name, address and telephone number of the commodity when there is not the name, address or telephone number of the commodity in a database.

13. The non-transitory storage medium according to claim 11, wherein the name for the commodity is extracted by a non-structured style, comprising:

searching texts of the web articles;

segmenting each sentence of the texts into several units/words through a natural language processing technology; and extracting the commodity name when a number of appearances of a segmented unit/word is more than a predetermined value.

14. The non-transitory storage medium according to claim 11, wherein the content summary is generated by:

segmenting users reviews in the recognized web articles into sentences;

extracting keywords after segmenting the sentence into words;

determining a polarity of emotion words after extracting emotion words according to emotion thesaurus; and generating a content summary of the commodity by outputting the keyword which appears most frequently and an emotion word of a much greater first number.

15. The non-transitory storage medium according to claim 14, further comprising:

displaying the content summary and the representative picture when receiving a keyword input by a user.

* * * * *